United States Patent [19]

Deleeuw et al.

[11] Patent Number: 5,162,269
[45] Date of Patent: Nov. 10, 1992

[54] POLYCRYSTALLINE SILICON CARBIDE FIBERS

[75] Inventors: David C. Deleeuw; Jonathan Lipowitz, both of Midland, Mich.; Paul P. Lu, Hacienda Heights, Calif.

[73] Assignee: Dow Corning Corporation, Midland, Mich.

[21] Appl. No.: 729,768

[22] Filed: Jul. 15, 1991

Related U.S. Application Data

[63] Continuation of Ser. No. 471,997, Jan. 16, 1990, Pat. No. 5,071,600.

[51] Int. Cl.$^5$ .............. C04B 35/02; C04B 35/52; C01B 33/06; C01B 31/36
[52] U.S. Cl. ............................ 501/88; 501/87; 501/94; 501/95; 423/344; 423/345
[58] Field of Search ............ 501/87, 88, 95, 96; 423/345, 344, 349

[56] References Cited

U.S. PATENT DOCUMENTS

| | | | |
|---|---|---|---|
| 3,971,840 | 7/1976 | Economy et al. | 264/231 |
| 4,248,814 | 2/1981 | Yajima et al. | 264/63 |
| 4,283,376 | 8/1981 | Yajima et al. | 423/345 |
| 4,342,712 | 8/1982 | Yajima et al. | 264/63 |
| 4,604,367 | 8/1986 | Takamizawa et al. | 501/95 |
| 4,847,027 | 7/1989 | Lu | 264/63 |
| 5,071,600 | 12/1991 | Deleeuw et al. | 264/22 |

Primary Examiner—William R. Dixon, Jr.
Assistant Examiner—Michael Marcheschi
Attorney, Agent, or Firm—Roger E. Gobrogge

[57] ABSTRACT

This invention relates to the preparation of thermally stable, substantially polycrystalline silicon carbide ceramic fibers derived from a polycarbosilane resin. The unexpected thermal stability of these fibers is achieved by the incorporation of boron prior to ceramification.

6 Claims, No Drawings

POLYCRYSTALLINE SILICON CARBIDE FIBERS

This is a continuation of copending application Ser. No. 07/471,997 filed on Jan. 16, 1990, now U.S. Pat. No. 5,071,600.

BACKGROUND OF THE INVENTION

This invention relates to the preparation of thermally stable, substantially polycrystalline silicon carbide ceramic fibers derived from a polycarbosilane resin. The unexpected thermal stability of these fibers is achieved by the incorporation of boron prior to ceramification.

Silicon carbide ceramic fibers are well known in the art for their mechanical strength at high temperatures. As such, they have found a broad array of utilities such as reinforcement for plastic, ceramic or metal matrices to produce high performance composite materials or the formation of fibrous products such as high temperature insulation, belting, gaskets and curtains.

Several methods have been developed to manufacture such fibers. For instance, it is well known that organosilicon polymers may be spun into a fiber, infusibilized (cured) to prevent melting and ceramified at elevated temperatures. Unfortunately, this method often introduces substantial amounts of oxygen or nitrogen into the fiber through incorporation in the polymer or introduction during spinning, infusibilization or ceramification. When these fibers are heated to temperatures above 1400° C., the oxygen and nitrogen is lost causing weight loss, porosity and decreased tensile strength.

Recently, polycarbosilane preceramic polymers which have a Si-C skeleton have been utilized to minimize the incorporation of nitrogen and oxygen. Yajima et al. in U.S. Pat. Nos. 4,052,430 and 4,100,233, for example, teach a method of producing silicon carbide fibers by spinning, infusibilizing and pyrolyzing various polycarbosilanes. Nippon Carbon Co., moreover, utilize this technology to produce a SiC ceramic fiber under the trade name NICALON ™ . These fibers too, however, are known to contain about 9-15% oxygen and, thus, degrade at temperatures as low as 1200° C. (see Mah et al., J. Mat. Sci. 19, 1191-1201 (1984)

The addition of other elements to polycarbosilanes has also been suggested as a means to improve the mechanical strength of SiC based bodies. For example, Yajima et al. in U.S. Pat. No. 4,359,559 disclose the production of polymetallocarbosilanes by mixing a polycarbosilane with a titanium or zirconium containing organometallic compound. Similarly, Yajima et al. in U.S. Pat. No. 4,347,347 teach the formation of an organometallic block copolymer composed of a polycarbosilane portion and a polymetallosiloxane portion wherein the metallic element is titanium or zirconium. Yajima et al. in U.S. Pat. No. 4,342,712 also teach the formation of titanium, silicon and carbon-containing ceramic fibers from a block copolymer of polycarbosilane and a titanoxane.

Yajima et al. in U.S. Pat. No. 4,248,814 teach a process for producing ceramic bodies comprising (1) preparing a polycarbosilane partly containing siloxane bonds by heating a mixture of a polysilane with 0.01 to 15 weight percent polyborosiloxane, (2) mixing the resultant polycarbosilane with a ceramic powder and (3) sintering at a temperature of from 800° C. to 2000° C. This process, however, fails to teach the formation of ceramic fibers.

Yajima et al. in U.S. Pat. Nos. 4,220,600 and 4,283,376 teach the formation of a polycarbosilane partly containing siloxane bonds by a process comprising adding 0.01 to 15 weight percent polyborosiloxane to a polysilane and then heating. This polycarbosilane can then be spun, cured and pyrolyzed to form silicon carbide ceramic fibers. Pyrolysis temperatures up to 1800° C. are disclosed in the reference but the examples only teach pyrolysis up to 1300° C.

The incorporation of these elements, however, is often accompanied by various problems. For instance, high temperature and pressure is often necessary to cause the incorporation. The yields of the resulting polymers are often low. Additionally, the elements often bond to the silicon though intermediate oxygen linkages so that increasing amounts of oxygen are present in the polymer. Further, silicon carbide based fibers so produced are typically composed of extremely fine crystalline grains; heating the fibers to temperatures of 1300° C. or higher causes growth of the grains which results in a decrease in mechanical strength of the fibers.

Takamizawa et al. in U.S. Pat. No. 4,604,367 teach the preparation of an organoborosilicon polymer by mixing an organopolysilane with an organoborazine compound, spinning fibers and then ceramifying the fibers by heating to temperatures in the range of 900°-1800° C. However, the actual examples in this reference only show heating up to 1300° C. and the tensile strength of the fibers is reported to drop off dramatically when heated above 1500° C. (note the graph on the cover of the reference)

Takamizawa et al. in U.S. Pat. No. 4,657,991 teach the formation of SiC fibers by using a composition comprising a polycarbosilane and a silmethylene polymer which may be copolymerized with an organometallic compound containing boron, aluminum, titanium or zirconium. After spinning the above composition, the fibers are pyrolyzed to between 800° and 1500° C. The inventors therein teach that pyrolysis at temperatures above 1500° C. decreases the mechanical strength of the resulting fiber due to grain size growth.

The present inventors have now unexpectedly found that thermally stable, substantially polycrystalline SiC fibers can be formed from polycarbosilanes with greater than about 0.2% boron incorporated therein and firing said fibers to greater than about 1600° C.

SUMMARY OF THE INVENTION

The present invention relates to a method for the preparation of thermally stable, substantially polycrystalline silicon carbide fibers. The method may comprise initially forming a fiber from a preceramic polymer comprising a polycarbosilane resin with at least about 0.2% by weight boron incorporated therein. The fiber is next infusibilized to render it non-melting and then pyrolyzed at a temperature of greater than about 1600° C. in a nonoxidizing environment.

Alternatively, the method may comprise forming a fiber from a preceramic polymer comprising a polycarbosilane resin. The fiber is then infusibilized and/or pyrolyzed in a manner such that at least about 0.2% by weight boron is incorporated therein. The thus treated fiber is then pyrolyzed at a temperature of greater than about 1600° C. in a non-oxidizing environment.

DETAILED DESCRIPTION OF THE INVENTION

The present invention is based on the discovery that polycarbosilane fibers which have at least about 0.2% by weight boron incorporated therein and which have been fired to a temperature greater than about 1600° C. form a substantially polycrystalline fiber which retains its strength at high temperatures. These fibers have at least 75% crystallinity, a density of at least about 2.9 gm/cc and a very low residual oxygen and/or nitrogen content.

The present inventors have found that both oxygen and nitrogen are eliminated from the fiber at temperatures above about 1400° C. which is believed to result in an initial weakening of the fiber. However, when boron is incorporated into fibers and said fibers are pyrolyzed above about 1600° C., it is believed the fibers undergo a densification process which decreases porosity and strengthens the fiber.

The boron may be incorporated into the fibers of the invention either prior to fiber formation and/or during at least one of the infusibilization step or the initial heating period for pyrolysis. The amount of boron necessary to achieve the desireable characteristics of such fibers is at least about 0.2% by weight with at least about 0.6% by weight being more preferred. Furthermore, it is desirable that the boron in the fibers be substantially uniformly distributed throughout the fibers. Each method of incorporation will be discussed in more detail infra.

The preceramic polymers used in the practice of this invention are polycarbosilane resins which contain a Si-C skeleton. Suitable polymers are described, for instance, by Yajima et al. in U.S. Pat. Nos. 4,052,430 and 4,100,233, both of which are incorporated herein in their entirety. The preferred polycarbosilane contains repeating ($-SiHCH_3-CH_2-$) units and can be purchased commercially from the Nippon Carbon Co.

If boron is to be incorporated prior to formation of the fiber, a boron-containing compound may, for example, be included in the polymerization process or said compound may be reacted into the polycarbosilane after its formation. Alternatively, a boron-containing compound may be simply uniformly mixed with the polycarbosilane prior to spinning.

The above polymers useful in the invention are generally solids at room temperature, can be readily spun into small diameter fibers, can be rendered infusible such that the polymer will remain in fiber form during pyrolysis, and will yield a ceramic composition in which the carbon to silicon ratio is slightly greater than 1 to 1. More preferably, these solid polymers have softening points less than about 100° C., thereby rendering them readily extrudable for conventional fiber spinning techniques.

Alternatively, a liquid polycarbosilane may be utilized to spin the fibers. However, when fibers are spun in this manner, they are generally solidified by rapid curing immediately after exiting the spinning apparatus.

The polycarbosilanes may be formed into fibers by any conventional spinning technique. For instance, such techniques as melt spinning, dry spinning or wet spinning may all be used in the practice of this invention.

The spun fibers formed in this manner are then generally drawn to diameters of less than about 100 micrometers. More preferably, said fibers are drawn to diameters of about 10-50 micrometers. Fibers of this size are generally more flexible than larger fibers and, thus, can be more readily woven into reinforcing matrices for composite materials.

The fibers formed above are then infusibilized to prevent melting during pyrolysis. If no boron is to be incorporated during this process, the fibers may be infusibilized, for example, by simply heating them to a temperature in the range of about 50° to about 200° C. in air. Alternatively, said fibers may be infusibilized by exposure to gamma irradiation, ultraviolet light or an oxidizing agent such as nitric oxide.

Preferably, however, the boron is incorporated into the fibers during said infusibilization step by exposure to a boron containing gas. This may be accomplished at relatively low temperatures of between about 25° to about 200° C. and below the softening point of the polymer. While the use of higher temperatures may increase the rate of infusibilization, exceeding the softening point of the polymer during this process may destroy the integrity of the fiber. It has, however, been found that as the cure proceeds, the softening temperature of the polycarbosilane increases so that the curing temperature may be raised as the polymer cures. The exposure time necessary to cure the fibers is variable depending on the cure gas, the polymer utilized, the diameter of the fibers and the concentration of boron in the curing atmosphere.

In one embodiment of the invention, the spun fiber is exposed to a diborane-containing gas which diffuses into the surface of said fibers and through to their cores and deposits boron therein at a temperature of from about 50° to about 200° C. Diborane concentrations of from about 0.01 to about 1.0 percent by volume diluted in an inert gas such as argon have been found to provide an atmosphere which will infusibilize the fiber while incorporating the desired concentrations of boron. Exposure to the above atmosphere should be for a time sufficient to permit the boron to diffuse substantially uniformly throughout the fiber to provide concentration levels of at least about 0.2% by weight.

In a second embodiment of the invention, the spun fiber is infusibilized by sequential exposure to a boron containing gas such as boron trifluoride, boron tribromide or boron trichloride and then to an amine such as ammonia. Preferably, both the boron containing gas and the amine gases are diluted in an inert gas such as argon or nitrogen. The boron containing gas is preferably present in the curing atmosphere at a concentration in the range of from about 10 to about 30% by volume and the amine is preferably present in the range of from about 1 to about 15% by volume. The fibers are generally exposed to these environments at a temperature in the range of about 25° to about 200° C. for a period of from about 4 to about 24 hours.

In a third embodiment of the invention, the spun fibers may be cured by exposure to an atmosphere containing nitric oxide followed by exposure to an atmosphere containing boron trichloride or diborane. Nitric oxide concentrations in the range of from about 1 to about 10% by volume diluted in an inert gas such as argon have been found to be useful when followed sequentially by exposure to either boron trichloride or diborane in the concentrations set forth supra. (The nitric oxide cure process is generally described in U.S. Pat. No. 4,847,027 which is incorporated herein in its entirety) The fibers are generally exposed to these environments at a temperature in the range of about 25° to about 200° C. for a period of from about 4 to about 24 hours.

After infusibilization, the fibers are pyrolyzed by heating to temperatures greater than about 1600° C., and preferably at a temperature of about 1800°–1850° C. in a non-oxidizing environment. It has been found that both oxygen and nitrogen are eliminated from the fibers at temperatures above about 1400° C. which is believed to result in an initial weakening of the fiber. However, upon reaching temperatures in excess of about 1600° C., it is believed the fibers undergo a densification process which decreases porosity and strengthens the fiber. Temperatures in excess of about 2000° C. are not preferred as there is undesirable grain size growth of the silicon carbide ceramic which adversely affects fiber strength.

The time for which the fibers are held at a particular maximum temperature should be sufficient to reduce oxygen and/or nitrogen content of the fibers to below about 0.5% by weight. For example, if the fibers are heated to about 1800° C., it has been found that temperature should be maintained for about 1 hour.

If boron is to be incorporated into the fibers during pyrolysis, it may occur during the initial stages of this process. For instance, the boron may be incorporated by exposure to a boron containing gas such as diborane during the time that the fibers are being heated up to the temperature at which pyrolysis and ceramification begins.

Typically, pyrolysis becomes significant at about 400° C. so that as the polymer is subjected to temperatures above about 400° C., the incorporation of boron becomes increasingly difficult. Accordingly, if boron is incorporated after the infusibilizing step, it is preferred to treat the fibers with a boron containing gas at a temperature below about 400° C. for a time sufficient for the desired amount of boron containing gas to diffuse into the fibers.

The boron containing gases which may be incorporated during the early stages of pyrolysis may include, for example, diborane or various other boron hydrides such as tetraborane or pentaborane, borazine and/or trichloroborazine. These compounds are generally utilized in small concentrations and diluted in inert gases as described supra. The fibers are generally exposed to these atmospheres at temperatures in the range of from about 50° to about 500° C. for about 1 to about 24 hours. After this period, the pyrolysis proceeds as described supra.

In addition to the methods described above, it is also within the scope of this invention to incorporate boron during more than one of the above steps (for example, during polymerization and during infusibilization) as well as in any other manner which would produce fibers with at least about 0.2% boron by weight.

The ceramic fibers which result from the process of this invention have at least 75% crystallinity and have a density of at least about 2.9 gm/cc, which represents about 90–95% of the theoretical density of SiC. The fibers also have a smooth surface structure and a grain size less than 0.5 micrometers, typically less than 0.2 micrometers. Virtually all of the oxygen and/or nitrogen originally present in, or introduced into, the fibers is removed by the high temperature pyrolysis step. Less than about 0.5%, and preferably less than about 0.2%, by weight oxygen and/or nitrogen remain.

The following non-limiting examples are included in order that one skilled in the art may more readily understand the invention.

The polycarbosilane utilized in the following examples was obtained from Nippon Carbon Co. It was dissolved in hexane, filtered through a 0.2 micron filter and dried before spinning. Argon, nitrogen and ammonia were obtained from Scott Specialty Gases. Boron Trichloride was obtained from Matheson Gas. All firings were performed on a tray made from Grafoil TM (Union Carbide). The Grafoil TM was fired up to 1200° C. for 2 hours in argon prior to use.

Cures were performed on a manifold with three gas/vacuum inlets (the mixing chamber) connected to a 1 inch inside diameter tubular Pyrex TM or quartz reactor (the curing chamber) with an outlet end oil bubbler. Gas flow was measured via flow meters. Teflon TM tubing was employed to transport gases to the mixing chamber. Pyrolyses were carried out in a Lindberg 2 inch or 4 inch inside diameter tubular furnace under argon with a standard ramp rate of 1° C./minute from ambient temperature to 1200° C.

High temperature pyrolysis studies were conducted under argon in a 2 inch Astro graphite tube furnace. High temperature pyrolysis runs were performed at 1800° C. under argon for 1 hour and were always preceded by a burn-out run.

All fiber testing was performed on an Instron 1122 machine. Elemental analyses were carried out on a CEC 240-XA elemental analyzer and oxygen analyses were carried out on a LECO analyzer. Scanning Electron Microscopy evaluation was performed on a Joel T300 at 15 Kev accelerating voltage.

EXAMPLE 1

A sample of polycarbosilane resin was melt spun at about 280° to about 320° C. on an in-house monofilament device with an orifice diameter of 0.01 inch and extruded therefrom.

The formed fibers were infusibilized by sequential treatment with $BCl_3$ and ammonia. During the initial phase, the fibers were treated with $BCl_3$ diluted in argon (volume ratio of 0.15 $BCl_3$:0.35 Ar) while heating from 25° to 140° C. over 4 hours. The resultant fibers were cooled to ambient temperature and then further treated with ammonia diluted in argon (volume ammonia to argon ratio of 0.15:1.0) for 15 hours. The infusibilized fibers were pyrolyzed to 1200° C. under argon at a rate of 1° C./minute. The black fibers which were produced were easily separable and had an average tensile strength of 215±49 Ksi, elastic modulus of 25.0±3.1 Msi and diameters of 7.7±0.5 micrometers.

The infusibilized fibers were then further pyrolyzed in an argon atmosphere at 1800° C. for 1 hour to produce separable black fibers which had become well densified. The ceramic fibers had an average tensile strength of 236±72 Ksi, elastic modulus of 32.0±2.4 Msi, diameters of 6.8±0.2 micrometers and densities in the range of about 2.8 to about 2.94 g/cc. The crystallite size was between about 500 to about 600 angstroms. (compared to Nicalon TM which produces crystallites larger than 1000 angstroms under similar conditions) As can be seen, the mechanical strength of the fibers was not adversely affected by pyrolysis at 1800° C.

For comparison, Nicalon fiber was pyrolyzed to 1800° C. under the same conditions described above. The resultant fibers crystallized and barely retained their physical integrity. The fibers were too weak to be tested.

EXAMPLE 2

A sample of polycarbosilane resin was melt spun in the same manner as Example 1. The formed fibers were infusibilized by sequential treatment with NO and diborane. During the initial phase, the fibers were treated with NO diluted in argon (volume ratio of 0.1 NO:2.0Ar) while heating from 25° to 200° C. over 24 hours. These fibers were then transferred to a Lindberg furnace and subjected to diborane treatment at 180° C. The infusibilized fibers were pyrolyzed from 180° to 1200° C. under argon at a rate of 1° C./minute. The black fibers which were produced were separable and had an average tensile strength of 247±47 Ksi, elastic modulus of 27.7±1.3 Msi and diameters of 7.4±0.2 micrometers.

The infusibilized fibers were then further pyrolyzed in an argon atmosphere at 1800° C. for 1 hour to produce black fibers. The ceramic fibers had an average tensile strength of 164±47 Ksi, elastic modulus of 25.7±1.3 Msi, and diameters of 6.9±0.0 micrometers.

For comparison, Nicalon fiber was pyrolyzed to 1800° C. under the same conditions described above. The resultant fibers crystallized and barely retained their physical integrity. The fibers were too weak to be tested.

EXAMPLE 3

A sample of polycarbosilane resin was melt spun in the same manner as Example 1. The formed fibers were infusibilized by sequential treatment with NO and $BCl_3$. During the initial phase, the fibers were treated with NO diluted in argon (volume ratio of 0.1 NO:2.0 Ar) while heating from 25° to 200° C. over 24 hours. These fibers were cooled to room temperature and then treated with $BCl_3$ diluted in argon (volume ratio of 0.15 $BCl_3$:0.35 Ar) while heating from 25° to 140° C. over 4 hours. The infusibilized fibers were pyrolyzed from 180° to 1200° C. under argon at a rate of 1° C./minute. The black fibers which were produced were separable and had an average tensile strength of 271±63 Ksi, elastic modulus of 25.9±1.9 Msi and diameters of 8.8±0.3 micrometers.

The infusibilized fibers were then further pyrolyzed in an argon atmosphere at 1800° C. for 1 hour to produce black fibers. The ceramic fibers had an average tensile strength of 243±19 Ksi, elastic modulus of 39.1±1.6 Msi, and diameters of 7.8±0.2 micrometers.

That which is claimed is:

1. Thermally stable, nitrogen-free silicon carbide fibers having at least 75% crystallinity which contain at least about 0.2 weight boron and which have a density of at least about 2.9 gm/cm$^3$ and an average tensile strength of at least about 164 ksi after heat treatment to a temperature of greater than about 1600° C.

2. The fibers of claim 1 in which said fibers have a diameter of less than about 50 micrometers.

3. The fibers of claim 1 in which said fibers have a grain size of less than about 0.2 micrometers.

4. The fibers of claim 1 which have an oxygen content less than about 0.5 weight percent.

5. The fibers of claim 1 which have an oxygen content less than about 0.2 weight percent.

6. The fibers of claim 1 in which said fibers have an average grain size of less than about 0.5 micrometers.

* * * * *